United States Patent
Beyda (10) Patent No.: US 8,418,919 B1
(45) Date of Patent: Apr. 16, 2013

(54) APPARATUS AND METHOD FOR MOBILE CHECKOUT

(75) Inventor: William Joseph Beyda, Cupertino, CA (US)

(73) Assignee: Intellectual Ventures Fund 79 LLC, Las Vegas, NV (US)

( * ) Notice: Subject to any disclaimer, the term of this patent is extended or adjusted under 35 U.S.C. 154(b) by 165 days.

(21) Appl. No.: 12/984,570

(22) Filed: Jan. 4, 2011

(51) Int. Cl.
*G06K 15/00* (2006.01)

(52) U.S. Cl.
USPC .......... 235/383; 235/487; 235/375; 235/381; 705/26

(58) Field of Classification Search .......... 235/383, 235/375, 381, 378, 487, 385; 705/26, 22, 705/28
See application file for complete search history.

(56) References Cited

U.S. PATENT DOCUMENTS

| | | | |
|---|---|---|---|
| 7,225,980 B2 | 6/2007 | Ku et al. | |
| 7,680,702 B1 * | 3/2010 | Oakes, III | 705/26.1 |
| 7,780,081 B1 * | 8/2010 | Liang | 235/383 |
| 8,177,125 B1 * | 5/2012 | Cooley et al. | 235/379 |
| 2002/0042774 A1 * | 4/2002 | Ortiz et al. | 705/39 |
| 2004/0111320 A1 | 6/2004 | Schlieffers et al. | |
| 2006/0293968 A1 | 12/2006 | Brice et al. | |
| 2008/0242275 A1 | 10/2008 | Yuba et al. | |
| 2008/0261510 A1 * | 10/2008 | Lin | 455/3.01 |
| 2008/0296392 A1 * | 12/2008 | Connell et al. | 235/472.01 |
| 2008/0308630 A1 | 12/2008 | Bhogal et al. | |
| 2009/0018927 A1 | 1/2009 | Bonner et al. | |
| 2012/0095853 A1 * | 4/2012 | von Bose et al. | 705/16 |

OTHER PUBLICATIONS

Eglinton, Chuck, "Mobile Check In: Your Wireless Phone becomes your Paperless Boarding Pass", ChuckEgg.com, Aug. 8, 2010, 9 pages.

* cited by examiner

*Primary Examiner* — Edwyn Labaze
(74) *Attorney, Agent, or Firm* — Stolowitz Ford Cowger LLP (57) ABSTRACT

In one example, a portable device having a camera downloads checkout software. The camera is then used to capture images of indicia associated with products in a store, such as bar codes. The portable device incrementally transmits messages to a remote server over a packet data connection of the portable device as the portable device moves through the store based on the captured images. The portable device then transmits a message requesting checkout to the remote server, and in response to receiving a reply to the message requesting checkout, causes a checkout price associated with purchasing the products to be displayed on a display of the portable device.

69 Claims, 5 Drawing Sheets

APPARATUS AND METHOD FOR MOBILE CHECKOUT

TECHNICAL FIELD

The present disclosure is related generally to self-service checkout at a store using a portable device, such as a cellular telephone.

BACKGROUND OF THE INVENTION

Some stores, such as some grocery and home improvement stores, provide self-service checkout using barcode scanners located at registers. Nevertheless, in such stores, the lines associated with using the self-service checkout registers often may be longer than the lines associated with employee-operated registers.

DETAILED DESCRIPTION

Figure 1:
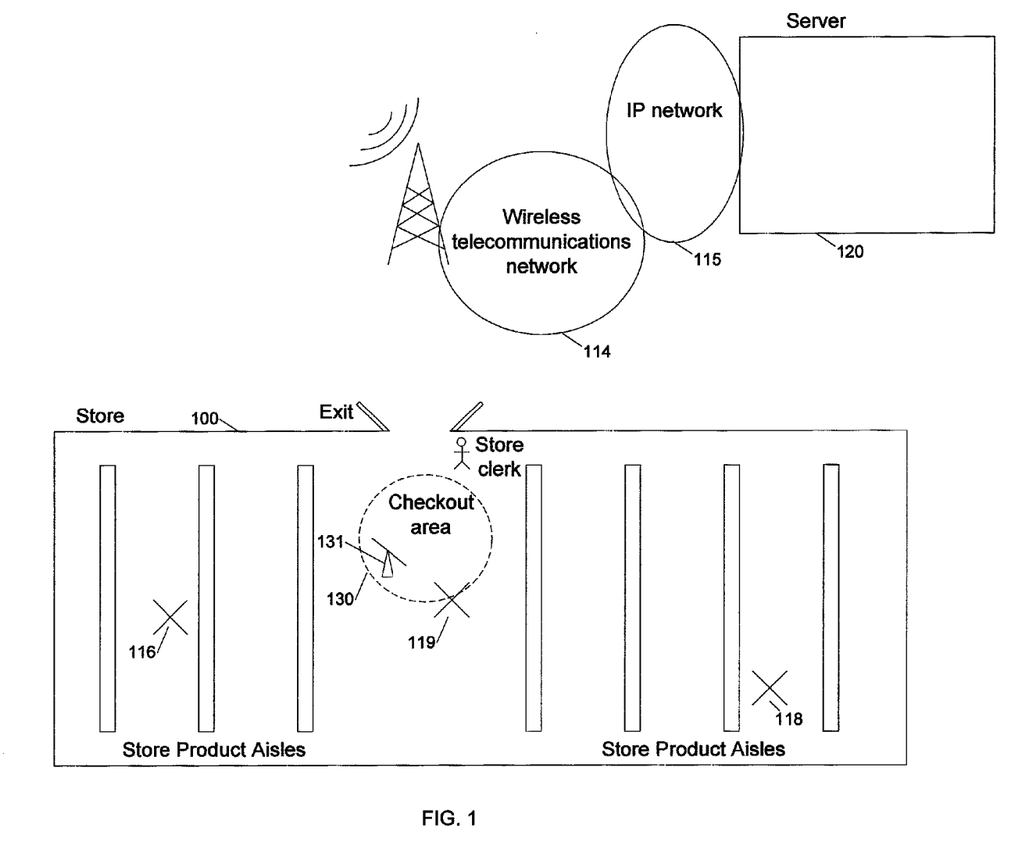
FIG. 1 depicts an example of mobile device checkout.

FIG. 1 depicts an example of mobile device checkout. For example, a store 100 may utilize mobile device checkout to provide a form of self-service checkout that allows a customer to use a portable device, e.g., a personal portable device, such as their own cellular telephone, to checkout of store 100. In one example, the customer may use a camera associated with their personal portable device to capture, e.g. scan, images of indicia, e.g. bar codes, identifying the items they wish to purchase from store 100.

For example, the customer may capture images as they are shopping, e.g., as they are walking through the aisles in store 100. Using mobile device checkout, as depicted in FIG. 1, the customer may scan some or all of the items the customer wishes to purchase using their personal mobile device before the customer enters a designated checkout area 130 of store 100.

In operation, a customer may download a mobile checkout application to a portable device comprising a camera, e.g. a camera integrated therewith, and having packet data connection capability. The customer may download the checkout application at any time, such as prior to arriving at store 100, upon arriving at store 100, or after arriving at store 100. In some examples, equipment located within store 100 or located elsewhere may be configured to detect that the portable device is approaching store 100 and cause a text message requesting approval for downloading the mobile checkout application to be delivered on the portable device.

After installing the mobile checkout application, the user then may follow the prompts to capture the indicia associated with the products they wish to purchase while shopping. For example, at a first location 116, a customer may use the portable device to capture the indicia associated with a particular product and then may place the particular product in a shopping cart. In conjunction with capturing the indicia associated with the particular product, the application may transmit information associated with the captured indicia via the packet data connection over intermediary networks, such as a first network 114 and/or a second network 115. A server 120 then may transmit information associated with the particular product, such as price information, back to the mobile device checkout application. The information associated with the particular product may be used to update a running monetary total associated with purchasing the particular product and all other products previously captured using the portable device, and the running monetary total may be displayed on the portable device. Similar activity may occur at a different location within store 100, such as at a second location 118.

When the customer is ready to checkout from store 100, the mobile checkout application may send an indication that the customer is ready to checkout to server 120. In one example, the mobile checkout application automatically may transmit the indication in response to the customer entering a perimeter of designated checkout area 130, e.g., upon the customer breaching a perimeter of designated checkout area 130, such as at a third location 119. In another example, the mobile checkout application may transmit the indication in response to the customer requesting checkout using an interface of the portable device.

After the mobile checkout application transmits the indication to server 120, the mobile checkout application then may display a checkout price of the portable device. The mobile checkout application also may request that the customer weigh the products using a scale 131 located in checkout area 130. The customer then may pay the checkout price using the portable device, another device, or any other accepted method of payment. In one example, a store clerk may compare products listed on a display of the portable device or on a printed receipt to the products in the possession of the customer to confirm whether the customer has paid for all of the products prior to leaving store 100.

Figure 2:
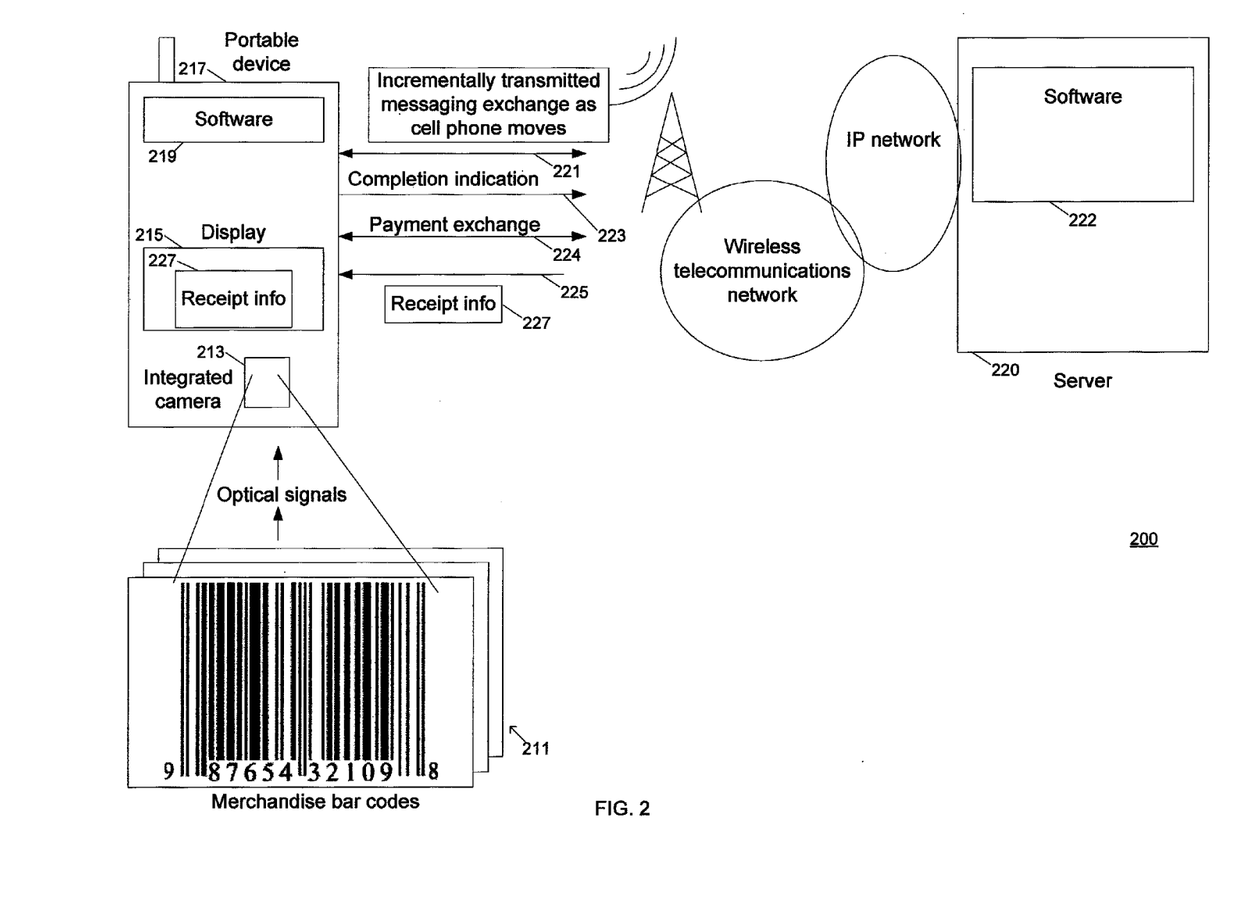
FIG. 2 depicts an example of a system for mobile device checkout.

FIG. 2 depicts an example of a system for mobile device checkout.

System 200 may include a portable device 217, which may be any portable device, such as a cellular telephone, having mobile checkout software 219 installed thereon, and a server 220 having mobile checkout software 222 installed thereon. Portable device 217 may be provided by the customer, e.g. a persona portable device, or may be provided by a store, e.g. a non-personal portable device. Such a non-personal portable device may be integrated with a shopping cart provided by the store, or may be provided separately to customers by the store.

Software 219 may be installed on portable device 217 at any time. Software 219 may be preloaded on portable device 217 by a device manufacturer, or may be installed during operation by a user of portable device 217. Software 219 may be pulled from a network in response to a request by the user, or automatically may be pushed by the network onto portable device 217 in response to occurrence of a predetermined event. Software 219 may be transferred to portable device 217 over a packet data connection, using a memory card, using a wired connection, or the like.

Portable device 217 may include a camera 213, e.g. a camera integrated with portable device 217. Software 219 may use camera 213 to capture indicia 211, such as bar codes, associated with different products offered for sale by the store. Such bar codes may be displayed on product packaging or may be displayed adjacent to the products, such as on a shelf or other structure associated with the products. Software 219 may display a prompt (not shown) on display 215 instructing a user how to orient camera 213 relative to indicia 211 to capture an image of indicia 211.

Software 219 may send a transmission message of incremental message exchange 221 in response to the customer capturing an image of indicia 211 using portable device 217. For example, at a first location, a customer may use portable device 217 to capture the indicia associated with a particular product and then may place the particular product in a shopping cart. In conjunction with capturing the indicia associated with the particular product, software 219 may transmit information associated with the captured indicia via the packet data connection over intermediary networks. At a second location, a customer may use portable device 217 to capture the indicia associated with a different product and then may place the different product in a shopping cart. In conjunction with capturing the indicia associated with the different product, software 219 may transmit information associated with the captured indicia via the packet data connection over intermediary networks. Each transmission of incremental message exchange 221 may include a captured image of indicia 211, such as bar codes, or, if portable device 217 includes an image recognition program, such as a bar code recognition program, an output from such program based on a corresponding image.

Software 222 may extract information from each received message of the incremental message exchange 221, and then may identify a corresponding product for the extracted information. Identification may include processing an image using an image recognition program accessible to server 220, such as located on server 220 or located on a remote network device. Software 222 then may compare an identified product to a database, such as a local or a remote database, to obtain corresponding product information, e.g., a current price of the identified product. Software 222 may send a response transmission for each transmission sent by software 219, in response to identifying the corresponding product information, e.g., the current price of the identified product.

In other examples, the product information for the corresponding product may be warranty information, product specifications, promotional information, or any combination thereof, to be displayed on portable device 217. An example of promotional information for the corresponding product may be a quantity discount, e.g., indicating that a price discount will be applied if the customer purchases at least a particular quantity of the product.

Software 222 also may insert, into the response transmissions of incremental message exchange 221, product information for a product different than the product to which the price information pertains. For example, software 222 may compare the product of the price lookup to a recommendation engine to identify at least one recommended product. Software 222 then may insert the product information for the recommended product. In such an example, portable device 217 may display, along with the price of the product corresponding to the scan, information about the recommended product as a form of advertisement for the different product. The product information for the different product may include discounts, e.g., coupons, for the different product.

The product information for the recommended product may include navigation directions to be output using portable device 217 for guiding the customer from their current location, as indicated by the recent scanning, through the store to a location of the recommended product. In such an example, server 220 may access a mapping of products to physical locations in the store, allowing software 222 to determine a current physical location of the customer in the store, based on the currently scanned product, and a destination location, based on the recommended product. The navigation directions may refer to aisle numbering in the store, may specify right or left turns, may specify a middle or an end of an aisle, or the like, similar to how a store employee might provide a customer with directions to a particular product. The navigation directions may be output by portable device 217, e.g., displayed on display 215, output over a speaker of the portable device 217 using voice scripts, or any combination thereof.

Software 219 may receive the incremental responses of incremental message exchange 221, and in response to each received response, may send a transmission to update a running monetary total displayed on portable device 217. For example, software 219 may receive over the packet data connection at least one first response to the incrementally transmitted messages 221, and may cause a checkout price associated with purchasing the products associated with the at least one first response to be displayed on portable device 217. Later, software 219 may receive over the packet data connection at least one second response to the incrementally transmitted messages 221, and may cause the displayed checkout price to be updated to reflect a checkout price associated with purchasing the products associated with the at least one first response and the products associated with the at least one second response.

When the customer is ready to check out from the store, software 219 may send an indication 223 to server 220 that the customer is ready for checkout. In one example, software 219 may transmit indication 223 in response to the customer requesting checkout using an interface of portable device 217, e.g., the customer activating a physical button of portable device 219, the customer activating a soft button displayed on display 215, the customer providing a voice input via a microphone of the portable device 219, or any combination thereof.

In some examples, a designated checkout area of the store may display indicia, such as a bar code, with instructions for the customer to scan the displayed indicia upon arriving in the designated checkout area. Upon capturing an image of the displayed indicia, software 219 may send indication 223, which may include the captured image of the displayed indicia or information based thereon. Software 222 infers that at a time the particular indicia was captured the portable device 217 was within a predetermined distance of a physical checkout location of the store, because the particular indicia only is located in the designated checkout area of the store.

In some examples, software 219 automatically may transmit indication 223 in response to detecting the customer entering the designated checkout area. For example, a Radio Frequency (RF) tag may be located in the designated area. A RF reader of portable device 217 may read the RF tag in response to portable device 217 arriving within a predetermined distance of the RF tag. Software 219, in response to identifying the particular tag, may infer that at a time the RF tag was read, portable device 217 was within a predetermined distance of a physical checkout location of the store. Software 219 then may generate and send indication 223 in response to the inference. Other schemes may be used for detecting the customer entering the designated checkout area, such as Global Positioning System (GPS) based schemes.

Software 222 may initiate a payment exchange 224 in response to receiving completion indication 223. For example, software 222 may transmit a request to weigh the products represented by the scanned indicia, which in turn may cause software 219 to display a prompt instructing the customer to place the products (or even the entire shopping cart) on a scale in the designated checkout area. Software 222 may identify predetermined weights of the products of the incrementally received messages 221, and may calculate a weight total based on the predetermined weights. Software 222 then may receive, from the scale or a device coupled to the scale, a message containing a measured weight. Software 222 may compare the measured weight to the calculated weight and, based on the comparison, may transmit a payment request to portable device 217.

Software 219 may display payment instructions in response to receiving the request for payment, for example a prompt asking the customer to provide payment for the products. In one example, the payment may be made using portable device 217. For example, portable device 217 may have default credit card information stored thereon, which may be selected for payment, or credit card information may be input into portable device 217 using an input mechanism of portable device 217. Software 219 then may transmit a payment confirmation to complete payment exchange 224. In other examples, a payment kiosk may be located in the designated checkout area.

In response to receiving payment confirmation, software 222 may send message 225 containing receipt information 227 to be displayed on portable device 217. Receipt information 227 may include an actual receipt to be displayed on portable device 217, or instructions for the customer to obtain a receipt. The instructions may direct the customer to take a receipt from a printer located in the designated checkout area, or may direct the customer to provide an email address to which the receipt may be sent.

Software 219 may be configured to display some or all of receipt information 227 on portable device 217. For example, software 219 may display a list of every purchased product. A store clerk may compare products listed on display 215 to the products in the possession of the customer to confirm whether the customer has paid for all the products prior to leaving the store.

Figure 3A:
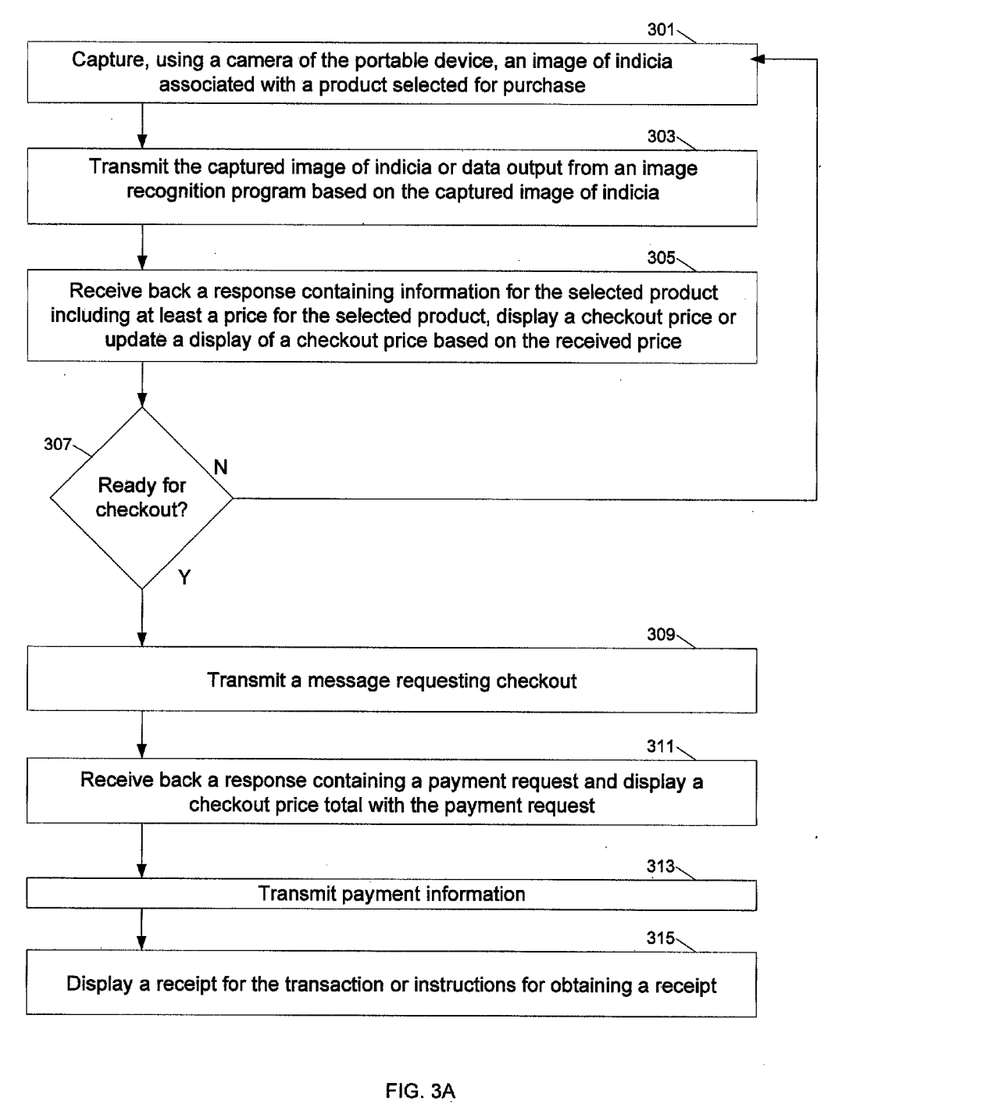
FIG. 3A depicts an example of a process associated with using a portable device in a mobile device checkout system.

FIG. 3A depicts an example of a process associated with using a portable device in a mobile device checkout system.

In block 301, the portable device may capture, using a camera of the portable device, an image of indicia associated with a product selected for purchase. In block 303, the portable device may transmit the captured image of indicia or data output from an image recognition program based on the captured image of indicia. In block 305, the portable device may receive back a response containing information for the selected product including at least a price for the selected product, and may display a checkout price or update a display of a checkout price based on the received price.

In diamond 307, the portable device may determine whether the customer is ready for checkout. In one example, the captured image is locally or remotely analyzed to determine whether indicia of the captured image corresponds to indicia of a particular image displayed in a checkout area of the store. In another example, an RF reader of the portable device may be used, as described previously. In another example, the portable device may monitor for a particular input sent via an input interface of the portable device. If the customer is not ready for checkout, the process may return to block 301 with the scanning of another image.

If the customer is ready for checkout, in block 309 the portable device may transmit a message requesting checkout. In block 311, the portable device may receive back a response containing a payment request and may display a checkout price total with the payment request. In block 313, the portable device may transmit payment information. In block 315, the portable device may display a receipt for the transaction or instructions for obtaining a receipt.

Figure 3B:
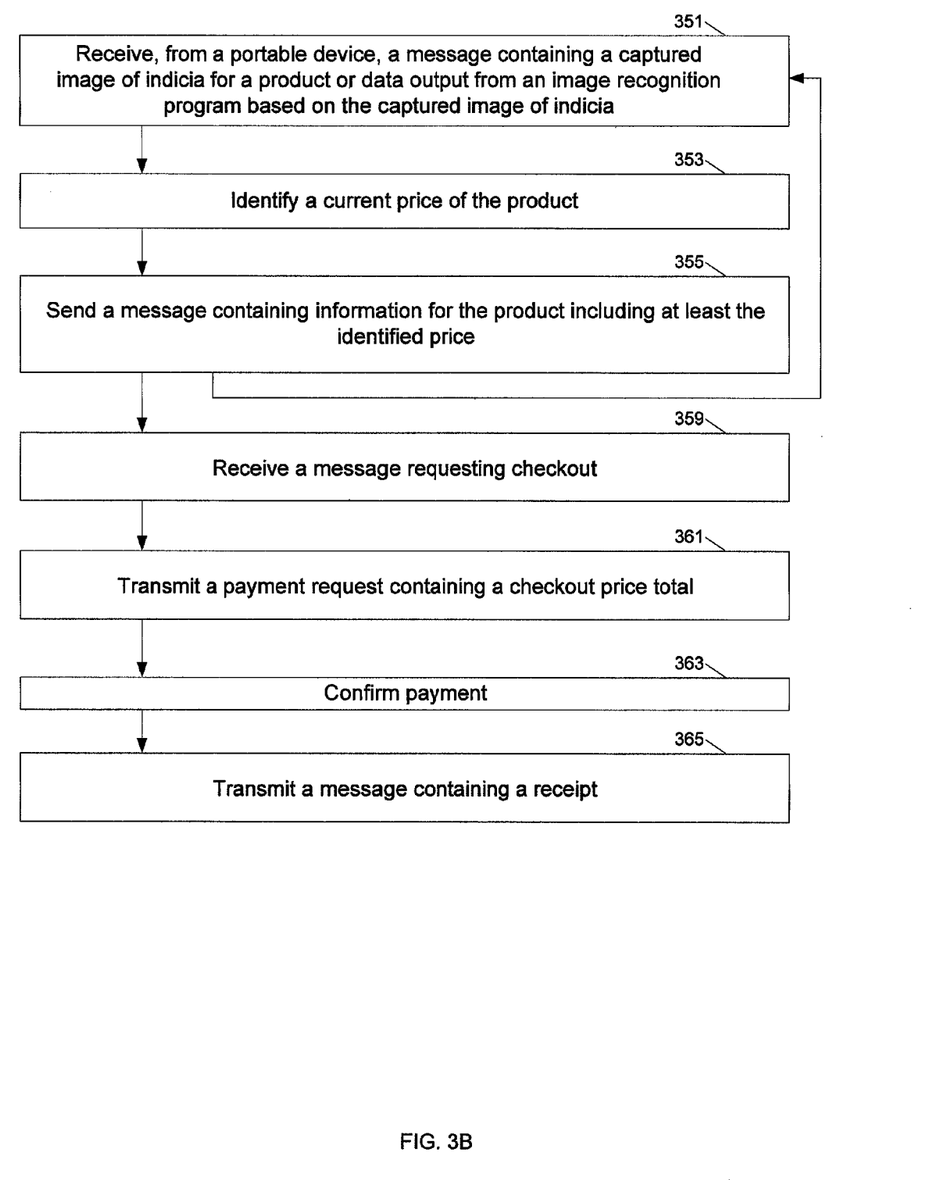
FIG. 3B depicts an example of a process associated with using a server in a mobile device checkout system.

FIG. 3B depicts an example of a process associated with using a server in a mobile device checkout system.

In block 351, the server may receive, from a portable device, a message containing a captured image of indicia for a product or data output from an image recognition program based on the captured image of indicia. In block 353, the server may identify a current price of the product. In block 355, the server may send a message containing information for the product including at least the identified price. Thereafter, the process may return to block 351 or continue to block 359, depending on the customer's actions.

In block 359, the server may receive a message requesting checkout. In block 361, the server may transmit a payment request containing a checkout price total. In block 363, the server may confirm payment. In block 365, the server may transmit a message containing a receipt.

Figure 4:
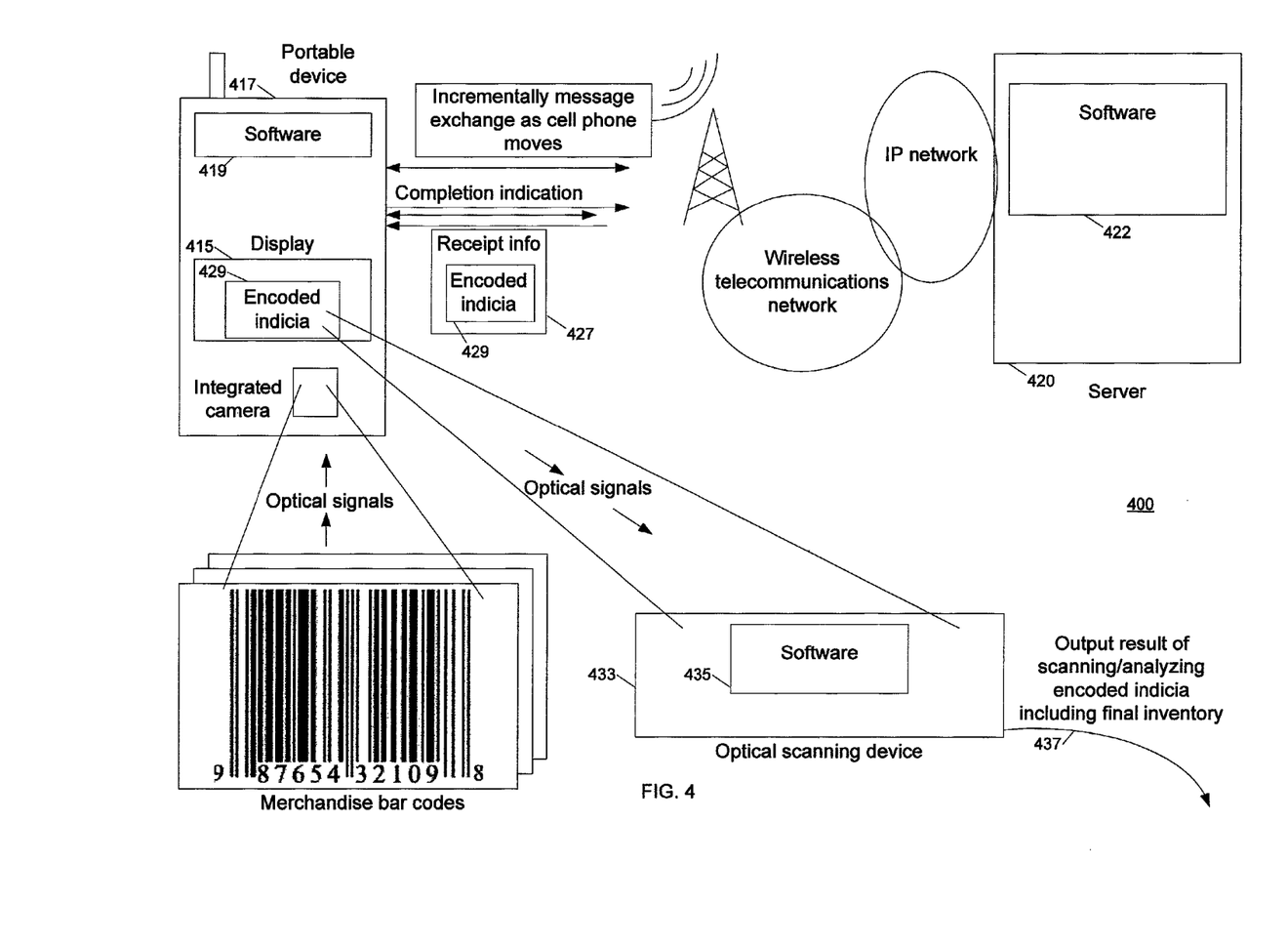
FIG. 4 depicts another example of a system for mobile device checkout.

FIG. 4 depicts another example of a system for mobile device checkout.

System 400 includes an optical scanning device 433 operated by a store clerk to verify that all products being carried out of the store exit have been purchased. Optical scanning device 433 may be a portable device carried by the store clerk, or could alternatively be fixed to a particular location near an exit of the store.

A series of events triggers the sending of receipt information 427, similar to the events that triggered the sending of the receipt information 227 of FIG. 2. However, receipt information 427 includes encoded indicia 429 inserted by software 422. Encoded indicia 429 may be a bar code, a character string, an image, etc. that encodes the list of products indicated to server 420 as having been purchased during a purchasing exchange between portable device 417 and server 420.

Software 419 may extract encoded indicia 429 from receipt information 427 and may display the encoded indicia on display 415, as depicted in FIG. 4. The store clerk then may ask the customer to show display 415 for scanning using optical scanning device 433 operated by the store clerk. Software 435 may decode encoded indicia 429 and may output 437 a product list for displaying on a display coupled to optical scanning device 433. The store clerk then may compare products listed on the display coupled to optical scanning device 433 to the products in possession of the customer to confirm whether the customer has paid for all the products prior to leaving the store.

In one example, a portable device is provided. The portable device may be a cell phone or other personal device provided by the customer. Alternatively, the portable device may be a non-personal device provided by the store.

The portable device includes a memory executable by a processor of the portable device, the memory having instructions stored thereon that, in response to execution by the portable device processor, cause the portable device to perform operations. One operation includes capturing, using a camera of the portable device, a plurality of images of indicia associated with products in a store, wherein each image of indicia is associated with a corresponding one of the products in the store. Another operation includes incrementally transmitting messages to a remote server over a packet data connection of the portable device as the portable device moves through the store, wherein at least one message of the incrementally transmitted messages is sent from a different physical location in the store than another message of the incrementally transmitted messages, and each message of the incrementally transmitted messages includes at least one of the captured images of indicia or data output from an image recognition program based at least one of the captured images of indicia. Another operation includes transmitting from the portable device a message requesting checkout. Another operation includes causing a checkout price associated with purchasing the products to be displayed on a display of the portable device in response to receiving a reply to the message requesting checkout.

The operations may also include receiving over the packet data connection at least one first response to the incrementally transmitted messages. Another operation includes causing a checkout price associated with purchasing the products associated with the at least one first response to be displayed on the display. Another operation includes receiving over the packet data connection at least one second response to the incrementally transmitted messages. Another operation includes causing the displayed checkout price to be updated to reflect a checkout price associated with purchasing the products associated with the at least one first response and the products associated with the at least one second response.

The operations may also include receiving over the packet data connection responses to the incrementally transmitted messages. Another operation includes extracting product information from one of the responses, the extracted product information corresponding to one of the products associated with one of the captured images of indicia. Another operation includes causing the extracted product information to be displayed on the display. The product information may include at least one of a price, warranty information, or product specifications.

The operations may also include selecting a particular advertisement associated with a particular product based on at least one of the products associated with the captured images of indicia, wherein the particular product is different than each of the products associated with the captured images of indicia. Another operation includes causing an advertisement associated with the particular product to be displayed on the display.

The operations may also include receiving a payment confirmation and, in response to receiving the payment confirmation, causing an electronic receipt to be displayed on the display.

The operations may also include receiving a payment confirmation and, in response to receiving the payment confirmation, causing an encoded indicia to be displayed on the display. The encoded indicia may include at least one of a bar code, an encoded character string, or an encoded image. The displayed indicia may encode a product listing identifying all of the products accounted for by the payment by price and quantity. The displayed indicia may encode a receipt.

The operations may also include transmitting the message requesting checkout in response to a user input sent using an input mechanism of the portable device.

The operations may also include capturing, using the camera, a particular indicia. Another operation includes analyzing the particular indicia to determine whether to infer that at a time the particular indicia was captured the portable device was within a predetermined distance of a physical checkout location of the store. Another operation includes transmitting the message requesting checkout in response to determining to infer that at the time the particular indicia was captured the portable device was within the predetermined distance of the physical checkout location. The particular indicia may comprise a bar code displayed at the physical checkout location.

The operations may also include causing a request to weigh the products on a scale to be displayed on the display. Another operation includes causing a payment request to be displayed on the display in response to receiving an indication that a scale-measured weight of the products corresponds to a weight calculated based on an expected scale-measured weight of the products.

In one example, a network device is provided. The network device may operate in any network such as a packet switched network. The network device may coupled to a portable device through any number of networks, including but not limited to a wireless telecommunications network, other types of wireless networks, a packet switched network, a circuit switched network, etc.

The network device includes a memory executable by a processor of the network device, the memory having instructions stored thereon that, in response to execution by the network device processor, cause the network device to perform certain operations. One operation includes incrementally receiving messages from a portable device as the portable device moves through a store, wherein at least one message of the incrementally received messages is sent from a different physical location in the store than another message of the incrementally received messages. Another operation includes extracting, from the incrementally received messages, at least one of images of indicia captured by the portable device or data output from an image recognition program operating on the portable device based on at least one of the captured images, wherein each image of indicia is associated with a corresponding one of a plurality of products in the store. Another operation includes comparing the extracted images or data to a database to identify prices of corresponding products. Another operation includes transmitting a checkout price based on the identified products in response to determining that the portable device moved into a checkout area of the store.

The operations may also include extracting a particular image captured by the portable device from a transmission originating from the portable device. Another operation includes analyzing the particular image to determine whether to infer that at a time the particular indicia was captured the portable device was within a predetermined distance of an image physically displayed in the checkout area. Another operation includes transmitting checkout information based on the analysis.

The operations may also include receiving an assertion that the portable device has moved into the checkout area of the store. Another operation includes detecting the presence of the portable device in the checkout area. Another operation includes transmitting over the packet data connection at least one first response to the incrementally received messages to cause a checkout price associated with purchasing the products associated with the at least one first response to be displayed on the portable device. Another operation includes transmitting over the packet data connection at least one second response to the incrementally received messages to cause the displayed checkout price to be updated to reflect a checkout price associated with purchasing the products associated with the at least one first response and the at least one second response.

The operations may also include comparing the extracted images or data to the same or another database to identify warranty information or product specifications in response to incrementally receiving the messages. Another operation includes incrementally transmitting messages including the identified warranty information or product specifications to the portable device as identified.

The operations may also include identifying another product that is associated with the particular product but different than the particular product in response to identifying a particular product identified in the incrementally received messages. Another operation includes transmitting to the portable device a message identifying the different product.

The operations may also include confirming payment, and in response to confirming payment, transmitting a control message including an encoded indicia to cause the portable device to display the encoded indicia. The encoded indicia may comprise a bar code, an encoded character string, or an encoded image. The displayed indicia may encode a product listing identifying all of the products accounted for by the payment by price and quantity. The displayed indicia may encode a receipt.

The operations may also include confirming payment, and in response to confirming payment, transmitting a control message including an electronic receipt to cause the portable device to display the electronic receipt.

The operations may also include transmitting instructions for checking out using the portable device in response to receiving an indication that the portable device has moved into a checkout area of the store.

The operations may also include identifying predetermined weights of the products of the incrementally received messages. Another operation includes calculating a weight total based on the predetermined weights. Another operation includes receiving a message containing a scale-measured weight. Another operation includes sending a message based on a comparison of the scale-measured weight to the calculated weight total.

The system and apparatus described above may use dedicated processor systems, micro controllers, programmable logic devices, or microprocessors that may perform some or all of the operations described herein. Some of the operations described above may be implemented in software and other operations may be implemented in hardware. Any operations, processes, or methods described herein may be performed by an apparatus, device, or system similar to those as described herein and with reference to the illustrated figures.

The processing device may execute instructions or "code" stored in memory. The memory may store data as well. The processing device may include, but may not be limited to, an analog processor, a digital processor, a microprocessor, multi-core processor, processor array, network processor, etc. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, storage array, or portable FLASH key fob. The memory and processing device may be operatively coupled together, or in communication with each other, for example by an I/O port, network connection, etc. such that the processing device may read a file stored on the memory. Associated memory may be "read only" by design (ROM) by virtue of permission settings, or not. Other examples of memory may include, but may not be limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

Operating instructions or commands may be implemented or embodied in tangible forms of stored computer software (also known as a "computer program" or "code"). Programs, or code, may be stored in a digital memory that may be read by the processing device. "Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. I claim all modifications and variation coming within the spirit and scope of the following claims.

The invention claimed is:

1. A system, comprising:
a portable device having a camera; and
a memory executable by a processor of the portable device, the memory having instructions stored thereon that, in response to execution by the portable device processor, cause the portable device to perform operations comprising:
capturing, using the camera, a plurality of images of indicia associated with products in a store, wherein each image of indicia is associated with a corresponding one of the products in the store;
incrementally transmitting messages to a remote server over a packet data connection of the portable device as the portable device moves through the store, wherein at least one message of the incrementally transmitted messages is sent from a different physical location in the store than another message of the incrementally transmitted messages, and each message of the incrementally transmitted messages includes at least one of the captured images of indicia or data output from an image recognition program based at least one of the captured images of indicia;
determining a position of the portable device relative to a predetermined position associated with the store;
transmitting from the portable device a message requesting checkout in response to determining the position of the portable device relative to the predetermined position; and
in response to receiving a reply to the message requesting checkout, causing a checkout price associated with purchasing the products to be displayed on a display of the portable device.

2. The system of claim 1, wherein the portable device is a cell phone.

3. The system of claim 1, wherein the operations further comprise:
   receiving over the packet data connection at least one first response to the incrementally transmitted messages;
   causing a checkout price associated with purchasing the products associated with the at least one first response to be displayed on the display;
   receiving over the packet data connection at least one second response to the incrementally transmitted messages; and
   causing the displayed checkout price to be updated to reflect a checkout price associated with purchasing the products associated with the at least one first response and the products associated with the at least one second response.

4. The system of claim 1, wherein the operations further comprise:
   receiving over the packet data connection responses to the incrementally transmitted messages;
   extracting product information from one of the responses, the extracted product information corresponding to one of the products associated with one of the captured images of indicia; and
   causing the extracted product information to be displayed on the display.

5. The system of claim 4, wherein the product information includes at least one of a price, warranty information, or product specifications.

6. The system of claim 1, wherein the operations further comprise:
   selecting a particular advertisement associated with a particular product based on at least one of the products associated with the captured images of indicia, wherein the particular product is different than each of the products associated with the captured images of indicia;
   causing an advertisement associated with the particular product to be displayed on the display.

7. The system of claim 1, wherein the operations further comprise:
   receiving a payment confirmation; and
   in response to receiving the payment confirmation, causing an electronic receipt to be displayed on the display.

8. The system of claim 1, wherein the operations further comprise:
   receiving a payment confirmation; and
   in response to receiving the payment confirmation, causing an encoded indicia to be displayed on the display.

9. The system of claim 8, wherein the encoded indicia comprises a bar code.

10. The system of claim 8, wherein the encoded indicia encodes a product listing identifying all of the products accounted for by the payment by price and quantity.

11. The system of claim 8, wherein the displayed indicia encodes a receipt.

12. The system of claim 1, wherein the operations further comprise transmitting the message requesting checkout in response to a user input sent using an input mechanism of the portable device.

13. The system of claim 1, wherein the operations further comprise:
   capturing, using the camera, a particular indicia;
   analyzing the particular indicia to determine whether to infer that at a time the particular indicia was captured the portable device was within a predetermined distance of a physical checkout location of the store; and
   transmitting the message requesting checkout in response to determining to infer that at the time the particular indicia was captured the portable device was within the predetermined distance of the physical checkout location.

14. The system of claim 13, wherein the particular indicia comprises a bar code displayed at the physical checkout location.

15. The system of claim 1, wherein the operations further comprise:
   causing a request to weigh the products on a scale to be displayed on the display; and
   in response to receiving an indication that a scale-measured weight of the products corresponds to a weight calculated based on an expected scale-measured weight of the products, causing a payment request to be displayed on the display.

16. An apparatus, comprising:
a processor configured to:
incrementally receive messages from a portable device as the portable device moves through a store, wherein at least one message of the incrementally received messages is sent from a different physical location in the store than another message of the incrementally received messages;
extract, from the incrementally received messages, at least one of images of indicia captured by the portable device or data output from an image recognition program operating on the portable device based on at least one of the captured images, wherein each image of indicia is associated with a corresponding one of a plurality of products in the store;
compare the extracted images or data to a database to identify prices of corresponding products; and
in response to determining that the portable device moved into a checkout area of the store, transmit a checkout price based on the identified products.

17. The apparatus of claim 16, wherein the processor is configured to:
   extract a particular image captured by the portable device from a transmission originating from the portable device;
   analyze the particular image to determine whether to infer that at a time the particular indicia was captured the portable device was within a predetermined distance of an image physically displayed in the checkout area; and
   transmitting checkout information based on the analysis.

18. The apparatus of claim 16, wherein the processor is configured to receive an assertion that the portable device has moved into the checkout area of the store.

19. The apparatus of claim 16, wherein the processor is configured to detect the presence of the portable device in the checkout area.

20. The apparatus of claim 16, wherein the processor is configured to:
   transmit over the packet data connection at least one first response to the incrementally received messages to cause a checkout price associated with purchasing the products associated with the at least one first response to be displayed on the portable device; and
   transmit over the packet data connection at least one second response to the incrementally received messages to cause the displayed checkout price to be updated to reflect a checkout price associated with purchasing the products associated with the at least one first response and the at least one second response.

21. The apparatus of claim 16, wherein the processor is configured to:
compare the extracted images or data to the same or another database to identify warranty information or product specifications in response to incrementally receiving the messages; and
incrementally transmit messages including the identified warranty information or product specifications to the portable device as identified.

22. The apparatus of claim 16, wherein the processor is configured to:
in response to identifying a particular product identified in the incrementally received messages, identify another product that is associated with the particular product but different than the particular product; and
transmit to the portable device a message identifying the different product.

23. The apparatus of claim 16, wherein the processor is configured to:
confirm payment; and
in response to confirming payment, transmit a control message including an encoded indicia to cause the portable device to display the encoded indicia.

24. The apparatus of claim 23, wherein the encoded indicia comprises a bar code.

25. The apparatus of claim 23, wherein the encoded indicia encodes a listing identifying all of the products accounted for by the payment by price and quantity.

26. The apparatus of claim 16, wherein the processor is configured to:
confirm payment; and
in response to confirming payment, transmit a control message including an electronic receipt to cause the portable device to display the electronic receipt.

27. The apparatus of claim 16, wherein the processor is configured to transmit instructions for checking out using the portable device in response to receiving an indication that the portable device has moved into a checkout area of the store.

28. The apparatus of claim 16, wherein the processor is configured to:
identify predetermined weights of the products of the incrementally received messages;
calculate a weight total based on the predetermined weights;
receive a message containing a scale-measured weight; and
send a message based on a comparison of the scale-measured weight to the calculated weight total.

29. A method, comprising
capturing, using a camera of a portable device, a plurality of images of indicia associated with products in a store, wherein each image of indicia is associated with a corresponding one of the products in the store;
incrementally transmitting messages to a remote server over a packet data connection of a portable device as the portable device moves through the store, wherein at least one message of the incrementally transmitted messages is sent from a different physical location in the store than another message of the incrementally transmitted messages, and each message of the incrementally transmitted messages includes at least one of the captured images of indicia or data output from an image recognition program based on at least one of the captured images of indicia;
determining a position of the portable device relative to a predetermined position associated with the store;
transmitting from the portable device a message requesting checkout in response to determining the position of the portable device relative to the predetermined position; and
in response to receiving a reply to the message requesting checkout, causing a checkout price associated with purchasing the products to be displayed on a display of the portable device.

30. The method of claim 29, further comprising:
receiving over the packet data connection at least one first response to the incrementally transmitted messages;
causing a checkout price associated with purchasing the products associated with the at least one first response to be displayed on the display;
receiving over the packet data connection at least one second response to the incrementally transmitted messages; and
causing the displayed checkout price to be updated to reflect a checkout price associated with purchasing the products associated with the at least one first response and the products associated with the at least one second response.

31. The method of claim 29, further comprising:
receiving over the packet data connection responses to the incrementally transmitted messages;
extracting product information from one of the responses, the extracted product information corresponding to one of the products associated with one of the captured images of indicia; and
causing the extracted product information to be displayed on the display.

32. The method of claim 31, wherein the product information includes at least one of a price, warranty information, or product specifications.

33. The method of claim 29, further comprising:
selecting a particular advertisement associated with a particular product based on at least one of the products associated with the captured images of indicia, wherein the particular product is different than each of the products associated with the captured images of indicia;
causing an advertisement associated with the particular product to be displayed on the display.

34. The method of claim 29, further comprising:
receiving a payment confirmation; and
in response to receiving the payment confirmation, causing an electronic receipt to be displayed on the display.

35. The method of claim 29, further comprising:
receiving a payment confirmation; and
in response to receiving the payment confirmation, causing an encoded indicia to be displayed on the display.

36. The method of claim 35, wherein the encoded indicia comprises a bar code.

37. The method of claim 35, wherein the encoded indicia encodes a product listing identifying all of the products accounted for by the payment by price and quantity.

38. The method of claim 35, wherein the displayed indicia encodes a receipt.

39. The method of claim 29, further comprising transmitting the message requesting checkout in response to a user input sent using an input mechanism of the portable device.

40. The method of claim 29, further comprising:
capturing, using the camera, a particular indicia;
analyzing the particular indicia to determine whether to infer that at a time the particular indicia was captured the portable device was within a predetermined distance of a physical checkout location of the store; and transmitting the message requesting checkout in response to determining to infer that at the time the particular indicia was captured the portable device was within the predetermined distance of the physical checkout location.

41. The method of claim 40, wherein the particular indicia comprises a bar code displayed at the physical checkout location.

42. The method of claim 29, further comprising:
causing a request to weigh the products on a scale to be displayed on the display; and
in response to receiving an indication that a scale-measured weight of the products corresponds to a weight calculated based on an expected scale-measured weight of the products, causing a payment request to be displayed on the display.

43. A method, comprising:
incrementally receiving, by a server, messages from a portable device as the portable device moves through a store, wherein at least one message of the incrementally received messages is sent from a different physical location in the store than another message of the incrementally received messages;
extracting, from each message of the incrementally received messages, at least one of images of indicia captured by the portable device or data output from an image recognition program operating on the portable device based on at least one captured image of indicia, wherein each image of indicia is associated with a corresponding one of a plurality of products in the store;
comparing, by the server, the extracted images or data to a database to identify prices of scanned products; and
in response to determining that the portable device moved into a checkout area of the store, transmitting, by the server, a checkout price based on the identified prices.

44. The method of claim 43, further comprising:
extracting a particular image captured by the portable device from a transmission originating from the portable device;
analyzing the particular image to determine whether to infer that at the time the physical indicia was captured the portable device was within a predetermined distance of an image physically displayed in the checkout area; and
transmitting checkout information based on the analysis.

45. The method of claim 43, further comprising receiving an assertion that the portable device has moved into the checkout area of the store.

46. The method of claim 43, further comprising detecting the presence of the portable device in the checkout area.

47. The method of claim 43, further comprising:
transmitting over the packet data connection at least one first response to the incrementally received messages to cause a checkout price associated with purchasing the products associated with the at least one first response to be displayed on the portable device; and
transmitting over the packet data connection at least one second response to the incrementally received messages to cause the displayed checkout price to be updated to reflect a checkout price associated with purchasing the products associated with the at least one first response and the at least one second response.

48. The method of claim 43, further comprising:
comparing the extracted images or data to the same or another database to identify warranty information or product specifications as the messages is incrementally received; and
incrementally transmitting messages including the identified warranty information or product specifications to the portable device as identified.

49. The method of claim 43, further comprising:
in response to identifying a particular product identified in the incrementally received messages, identifying another product that is associated with the particular product but different than the particular product; and
transmitting to the portable device a message identifying the different product.

50. The method of claim 43, further comprising:
confirming payment; and
in response to confirming payment, transmitting a control message including an encoded indicia to cause the portable device to display the encoded indicia.

51. The method of claim 50, wherein the encoded indicia comprises a bar code.

52. The method of claim 50, wherein the encoded indicia encodes a product listing identifying all of the products accounted for by the payment by price and quantity.

53. The method of claim 50, wherein the displayed indicia encodes a receipt.

54. The method of claim 43, further comprising:
confirming payment; and
in response to confirming payment, transmitting a control message including an electronic receipt to cause the portable device to display the electronic receipt.

55. The method of claim 43, further comprising transmitting instructions for checking out using the portable device in response to receiving an indication that the portable device has moved into the checkout area of the store.

56. The method of claim 43, further comprising:
identifying predetermined weights of the products of the incrementally received messages;
calculating a weight total based on the predetermined weights;
receiving a message containing a scale-measured weight; and
sending a confirmation based on a comparison of the scale-measured weight to the calculated weight total.

57. A portable device, comprising:
means for capturing a plurality of images, wherein each image is associated with a corresponding one of a plurality of products in a store;
means for incrementally transmitting messages over a packet data connection to a remote server as the portable device moves through the store, wherein at least one message of the incrementally transmitted messages is sent from a different physical location in the store than another message of the incrementally transmitted messages, and each message of the incrementally transmitted messages includes at least one of the captured images of indicia or data output from an image recognition program based on the captured images of indicia; and
means for displaying a checkout price for products associated with the images in response to receiving an indication that the portable device has moved into a checkout area of the store.

58. The portable device of claim 57, further comprising means for causing a total displayed on the portable device to be updated as responses to the incrementally transmitted messages are received.

59. The portable device of claim 57, further comprising means for extracting product information from one of a plurality of responses to the incrementally transmitted messages, the extracted product information corresponding to one of the products associated with the captured images of indicia.

60. The portable device of claim 59, wherein the product information includes at least one of a price, warranty information, or product specifications.

61. The portable device of claim 57, further comprising:
selecting a particular advertisement associated with a particular product based on at least one of the products associated with the captured images of indicia, wherein the particular product is different than each of the products associated with the captured images of indicia;
causing an advertisement associated with the particular product to be displayed on the display.

62. The portable device of claim 57, further comprising means for causing an electronic receipt to be displayed in response to receiving a payment confirmation.

63. The portable device of claim 57, further comprising means for causing an encoded indicia to be displayed in response to receiving a payment confirmation.

64. The portable device of claim 63, wherein the encoded indicia comprises a bar code.

65. The portable device of claim 63, wherein the encoded indicia encodes a product listing identifying all of the products accounted for by the payment by price and quantity.

66. The portable device of claim 63, wherein the displayed indicia encodes a receipt.

67. The portable device of claim 57, further comprising means for transmitting a message requesting checkout in response to a user input sent from a user interface of the portable device.

68. The portable device of claim 57, further comprising means for validating that the portable device is within a predefined distance of a physical checkout location of the store at a particular instant by analyzing a captured image or transmitting the captured image for remote analysis.

69. The portable device of claim 57, further comprising means for causing a message requesting payment to be displayed on the display in response to receiving a confirmation that a scale-measured weight corresponds to an expected scale-measured weight of the products.

* * * * *

UNITED STATES PATENT AND TRADEMARK OFFICE
CERTIFICATE OF CORRECTION

| | | |
|---|---|---|
| PATENT NO. | : 8,418,919 B1 | Page 1 of 1 |
| APPLICATION NO. | : 12/984570 | |
| DATED | : April 16, 2013 | |
| INVENTOR(S) | : Beyda | |

It is certified that error appears in the above-identified patent and that said Letters Patent is hereby corrected as shown below:

In the Specification

In Column 4, Lines 29-30, delete "portable device 219," and insert -- portable device 217, --, therefor.

In Column 4, Line 32, delete "portable device 219," and insert -- portable device 217, --, therefor.

In the Claims

In Column 13, Line 50, in Claim 29, delete "comprising" and insert -- comprising: --, therefor.

Signed and Sealed this
Twenty-seventh Day of August, 2013

Teresa Stanek Rea
*Acting Director of the United States Patent and Trademark Office*